UNITED STATES PATENT OFFICE.

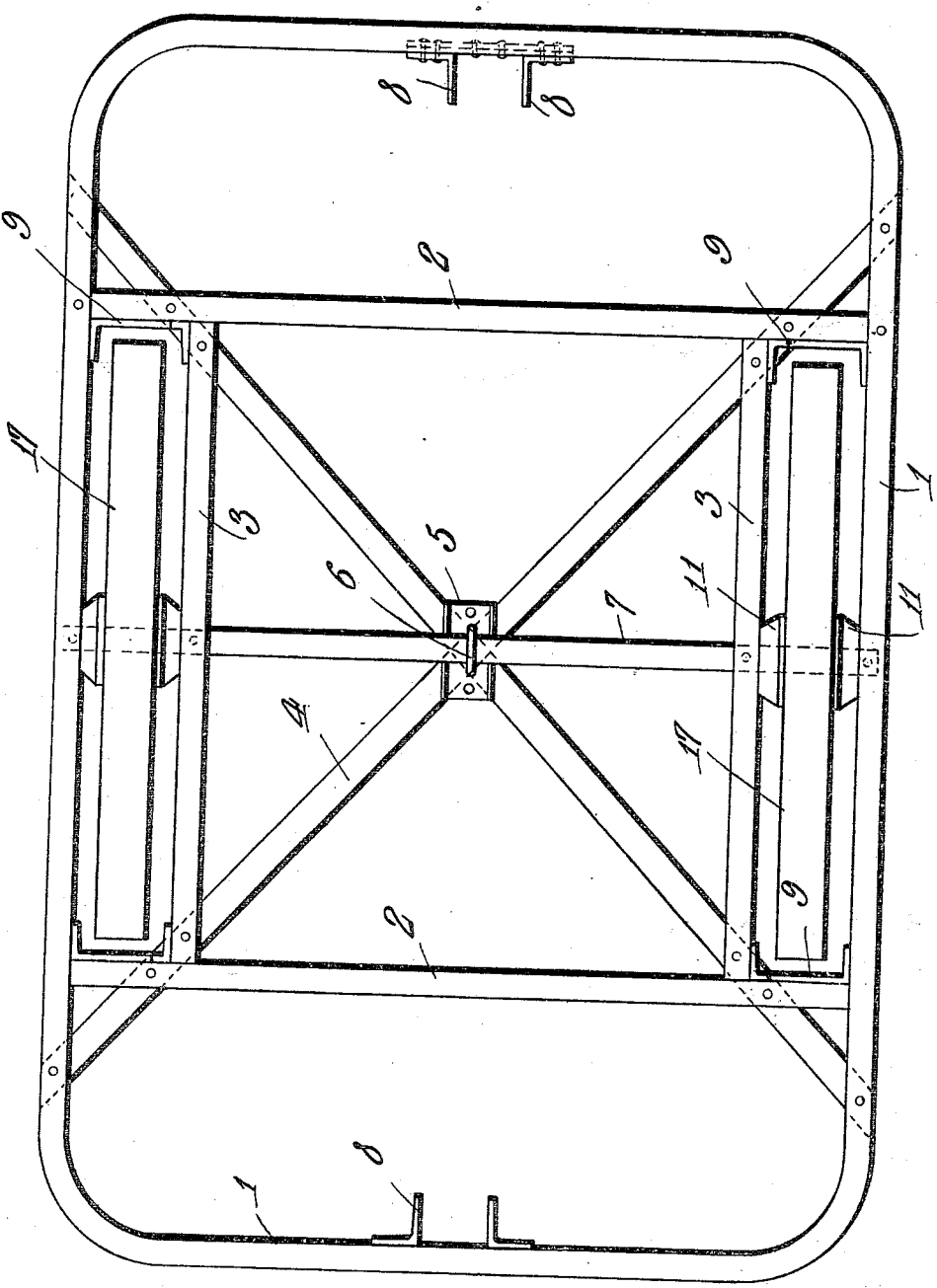

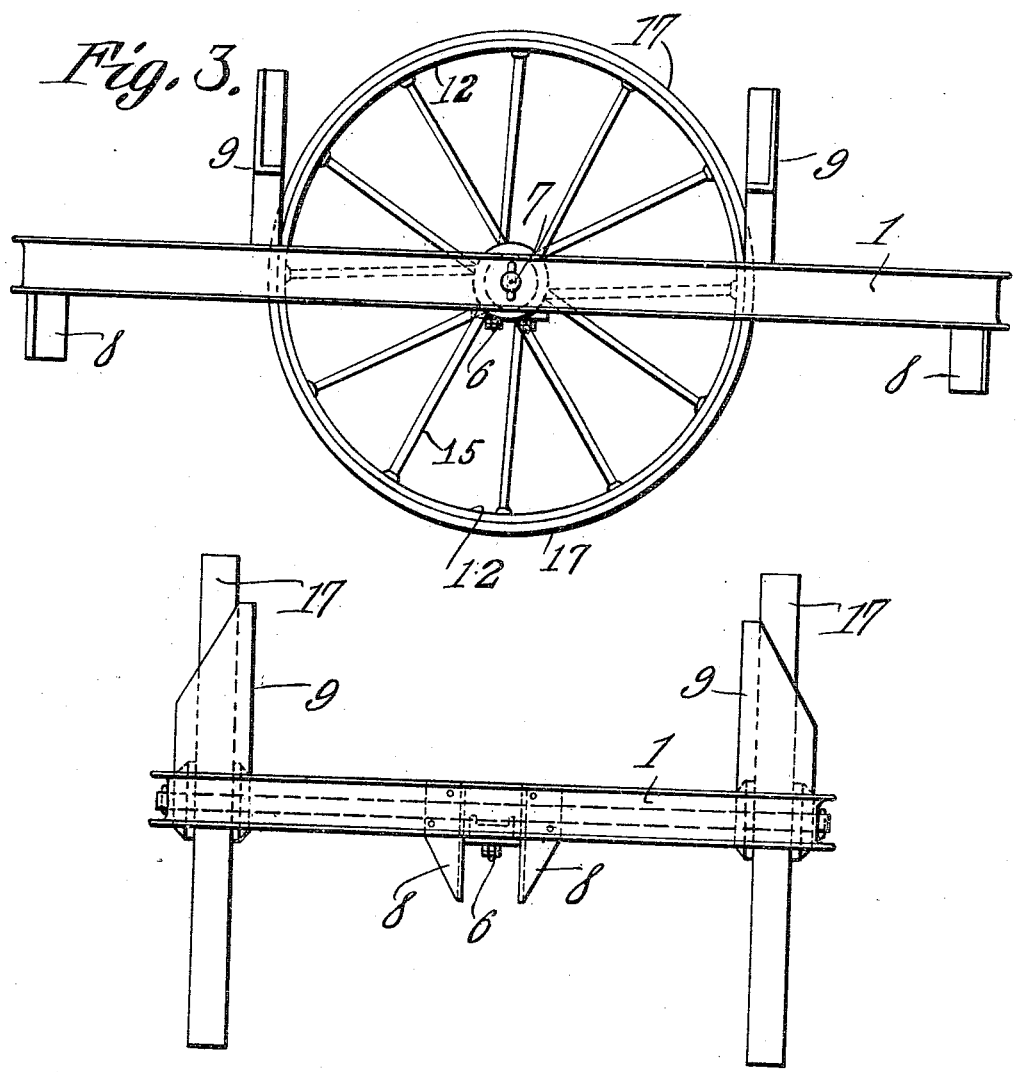

ERNEST BRISCOE MERRY, OF MEMPHIS, TENNESSEE.

LUMBER-TRUCK.

957,431.  Specification of Letters Patent.  Patented May 10, 1910.

Application filed April 6, 1909. Serial No. 488,261.

*To all whom it may concern:*

Be it known that I, ERNEST BRISCOE MERRY, a citizen of the United States, residing at Memphis, in the county of Shelby and State of Tennessee, have invented a new and useful Lumber-Truck, of which the following is a specification.

This invention relates to lumber trucks and has for its object to provide a base frame or body the parts of which are so arranged as to transmit all pulling strains directly from the pulling bar to the frame, thus relieving the axle of the device of all transverse strains resulting from the pulling of the truck, and therefore avoiding the buckling or springing of the axle.

A further object is to provide a frame, all parts of which are braced together in a novel manner, the bracing means serving to transmit pulling strains to the frame from the pulling bar.

A further object is to so mount the axle as to provide a bearing therefor close to and at each side of each wheel.

With these and other objects in view the invention consists in certain novel details of construction and combinations of parts hereinafter more fully described and pointed out in the claims.

In the accompanying drawings the preferred form of the invention has been shown.

In said drawings:—Figure 1 is a plan view of a lumber cart or buggy constructed in accordance with the present invention. Fig. 2 is an end elevation thereof. Fig. 3 is a side elevation of the truck.

Referring to the figures by characters of reference 1 designates the frame of the body, the same being preferably substantially rectangular and being provided at intermediate points with transversely extending parallel cross members 2 connected near their edges by longitudinal braces 3, which are parallel with the sides of the frame 1. Diagonal braces 4 connect the front portions of the sides of frame 1 and also extend across and are secured to the cross members 2 and the longitudinal braces 3, these diagonal braces being also secured together at the points where they cross, there being a coupling member 5 secured to the intersecting portions of the diagonal braces and designed to receive a U-bolt 6. The axle 7 of the buggy extends through the U bolt and is mounted at its ends in the sides of frame 1 and in the longitudinal braces 3, there being sufficient space between each side of the frame and the adjoining longitudinal brace 3 to receive one of the wheels of the buggy. The pulling bar of the cart or buggy is designed to be secured to the U bolt 6 and to extend between depending guides 8 secured to the ends of the frame 1. Standards 9 are secured to the cross members 2 between the sides of frame 1 and the adjoining longitudinal braces 3, these standards extending upwardly considerable distances and designed to hold the lumber from coming into contact with the wheels.

All parts of the frame, including its braces, standards and guides, may be formed of metal, such as angle-irons, channel-irons, Z-irons, etc., it merely being necessary to so arrange them as to produce a structure embodying the features disclosed in the drawings and heretofore described.

The wheels used in connection with the truck can be of any preferred construction, and in the drawings the hub of each wheel has been indicated at 11, the spokes at 15 and the rim and tire at 12 and 17, respectively. The length of the hub of the wheel is equal to the width of the space between each side of frame 1 and the adjoining longitudinal brace 3. The hub will thus bear against the side of the frame and the longitudinal brace and be held against lateral displacement.

By providing a lumber cart or buggy such as herein described it will be seen that when the same is drawn forward the pulling-bar will not spring the axle 7, because the strain is distributed through the diagonal braces 4 to all parts of the frame. Moreover, inasmuch as said axle 7 has a bearing at each side of the wheel it will be seen that there is absolutely no danger of the axle bending at its ends under the heavy weight to which it is subjected.

It is to be understood that whenever desirable the axle can be extended under the frame instead of through it, this arrangement requiring merely obvious changes in the structure herein described.

Obviously various changes may be made in the construction and arrangement of the parts without departing from the spirit or sacrificing the advantages of the invention.

What is claimed is:—

1. A lumber buggy comprising a wheel-supported frame, means thereon for attachment to a pulling-bar, and means for transmitting draft strains from said means and along diagonal lines to the frame.

2. A lumber buggy comprising a wheel-supported frame, means thereon for attachment to a pulling-bar, and diagonal bracing means for transmitting draft strains from said means to the frame.

3. A lumber buggy comprising a wheel-supported frame, cross members thereon, longitudinal braces connecting the cross members, diagonal braces secured to the frame, cross members and longitudinal braces, said members intersecting at a central point, and means carried by the diagonal braces for attachment to a pulling-bar.

4. A lumber buggy comprising a frame, cross members connecting the sides thereof, longitudinal braces connecting the cross members, diagonal braces secured to the sides of the frame and to the cross members and longitudinal braces, said diagonal braces intersecting at a central point, means secured to the intersecting portions of the diagonal braces for attachment to a pulling-bar, an axle mounted in the sides and the longitudinal braces of the frame and connected to the intersecting portions of the diagonal braces, and supporting wheels upon the axle and between the sides and the adjoining longitudinal braces.

5. A lumber buggy comprising a frame, an axle extending transversely thereof, supporting wheels upon the axle, said axle having bearings at each side of and close to each of the wheels, means upon the frame for attachment to a pulling-bar, and means for distributing draft strains upon said first mentioned means and along diagonal lines to the frame.

6. A lumber buggy comprising a frame, cross members thereon, longitudinal braces connecting the cross members, standards extending from the cross members and between the sides and longitudinal braces of the frame, supporting wheels interposed between the sides and longitudinal braces, and an axle extending transversely of the frame and through the supporting wheels, said axle bearing in the sides of the frame and the longitudinal braces.

7. A lumber buggy comprising a frame, diagonal braces secured thereon, said braces intersecting at a central point, means connected to said braces for attachment to a pulling-bar, supporting wheels for the frame, and means upon the end portions of the frame for holding a pulling-bar against lateral displacement.

8. A lumber buggy comprising a frame, longitudinal braces parallel with the sides of the frame, an axle extending through and bearing in said braces and the sides of the frame, and a supporting wheel upon each end portion of the axle and between the side of the frame and the adjoining longitudinal brace, said wheel including a hub bearing at its ends against the side of the frame and the longitudinal brace.

In testimony that I claim the foregoing as my own, I have hereto affixed my signature in the presence of two witnesses.

ERNEST BRISCOE MERRY.

Witnesses:
D. H. POPE,
E. H. WILSON.